United States Patent [19]
Meyer et al.

[11] 3,796,327
[45] Mar. 12, 1974

[54] MANUFACTURING SYSTEM

[76] Inventors: Ronald F. Meyer, 4475 S. 131st St., New Berlin, Wis. 53151; Frank J. Schalk, 4280 N. 163rd St.; Robert K. Sedgwick, 18950 N. Hills, both of Brookfield, Wis. 53005; John E. Schluge, S. 92nd St., Hales Corners, Wis. 53150

[22] Filed: July 14, 1972

[21] Appl. No.: 271,918

Related U.S. Application Data
[63] Continuation of Ser. No. 32,226, April 27, 1970, abandoned.

[52] U.S. Cl. ............... 214/38 BB, 104/88, 198/19, 214/38 C
[51] Int. Cl. ............................................ B65g 67/02
[58] Field of Search ........... 214/38 B, 38 BB, 38 C, 214/38 D; 198/19; 104/88; 235/151.11

[56] References Cited
UNITED STATES PATENTS

| | | | |
|---|---|---|---|
| 1,830,740 | 11/1931 | Leech et al. | 214/38 B X |
| 3,338,177 | 8/1967 | Mirel | 104/88 |
| 3,483,829 | 12/1969 | Barry | 104/88 X |
| 3,495,677 | 2/1970 | Wilson | 214/16 B X |
| 3,530,571 | 9/1970 | Perry | 198/38 X |
| 3,572,484 | 3/1971 | Richens | 104/88 X |
| 3,576,540 | 4/1971 | Fair | 235/151.11 X |

*Primary Examiner*—Robert G. Sheridan
*Attorney, Agent, or Firm*—Cyril M. Hajewski

[57] ABSTRACT

A manufacturing system having one or more loading and unloading stations and a plurality of spaced apart numerically controlled machine tools, the operation of which is effected by direct computer control. The manufacturing system includes a workpiece supply system comprising a closed loop trackway on which one or more cars are supported for guided movement to the various stations. The car carries a pallet on which a work holding fixture with a workpiece is secured, and transports the pallet to a computer selected machine station. At the selected station the pallet is automatically removed from the car and placed on a multiple positionable table which serves as a workpiece receiving and storage device from which a desired next workpiece to be supplied to the machine tool is automatically selected and transferred thereto by computer control. The computer automatically directs an empty car to the unloading side of the machine tool to receive a pallet with a workpiece that a work operation has been performed on and then by computer direction returns to the unload station where the pallet is removed or the car will be directed to advance the workpiece to a different machine tool.

18 Claims, 14 Drawing Figures

INVENTORS
RONALD F. MEYER, FRANK J. SCHALK,
ROBERT K. SEDGWICK, JOHN E. SCHLUGE
BY Robert C Jones
ATTORNEY

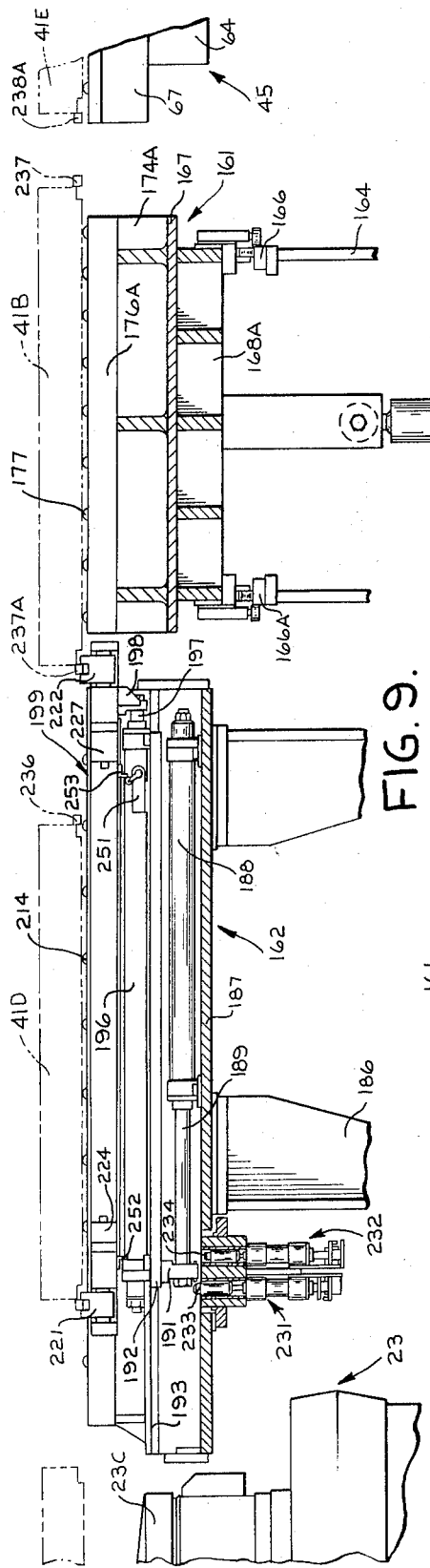
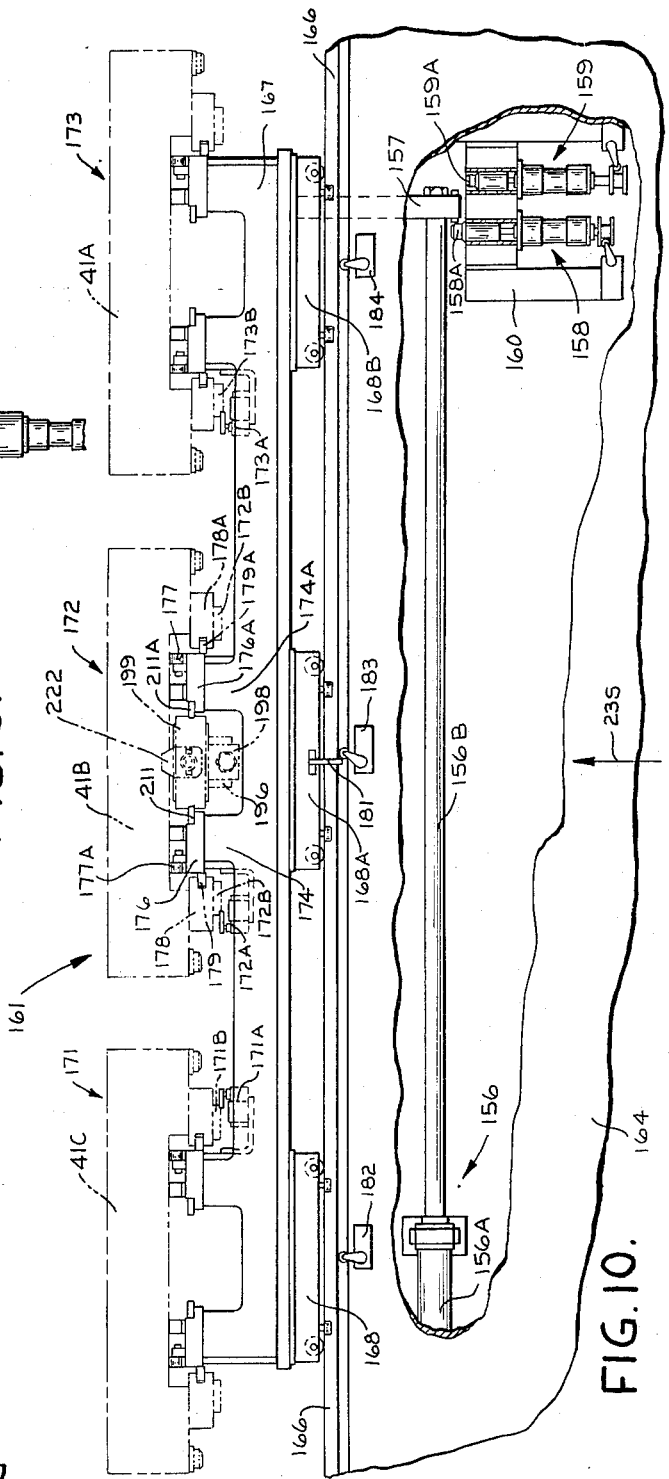

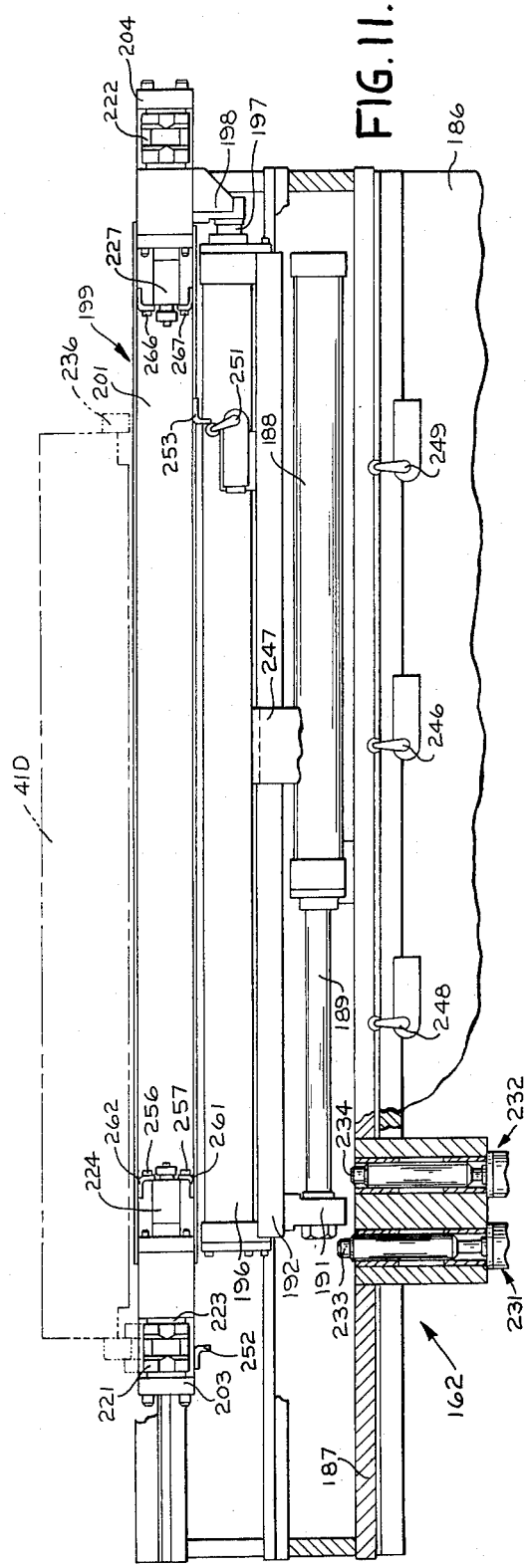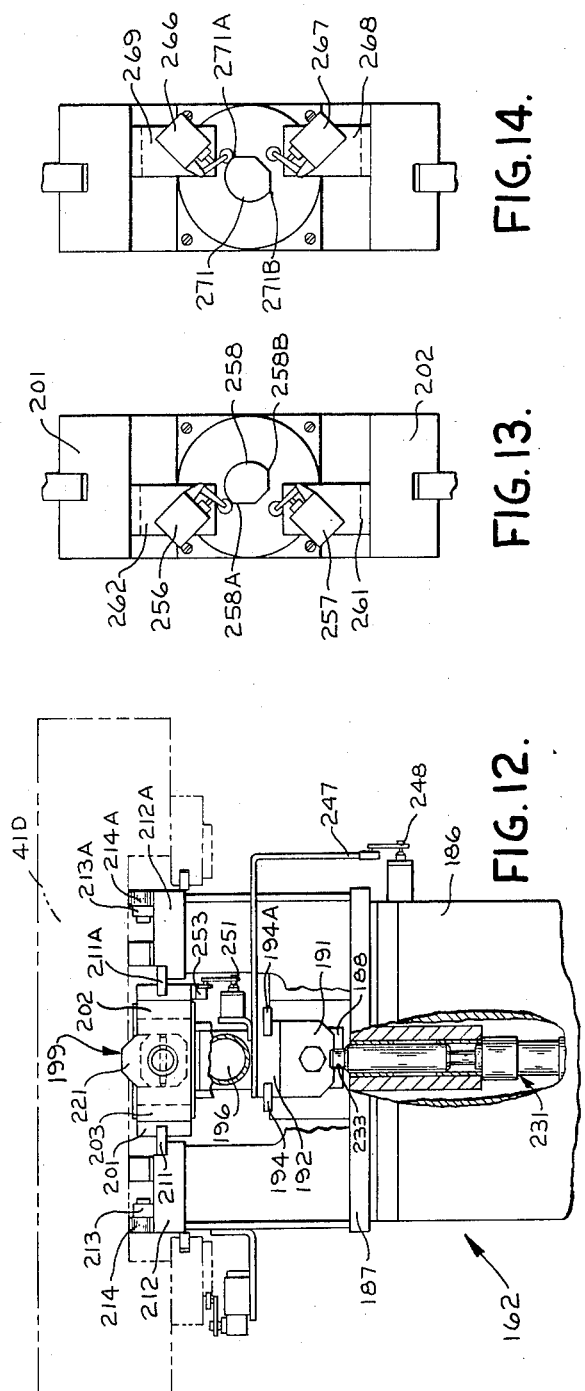
INVENTORS
RONALD F. MEYER, FRANK J. SCHALK,
ROBERT K. SEDGWICK, JOHN E. SCHLUGE
BY Robert C. Jones
ATTORNEY

MANUFACTURING SYSTEM

This is a continuation of application Ser. No. 32,226, filed Apr. 27, 1970, now abandoned.

BACKGROUND OF THE INVENTION

Studies have been made of the well-known transfer line types of machines which are normally found in high production type industries. The studies showed that the transfer line type of machine tools are well adapted to their purpose when a great number of similar workpieces are to be produced. However, when a production of a medium size run of similar workpieces is to be accomplished, the inherent advantages of the transfer type of machine is no longer available. This is true because the unit cost would be much too great. It was also found that with production line types of transfer machines an intermixture of various parts could not be accomplished on a single transfer line.

The study indicated that for medium production lot manufacturing, a manufacturing system had to be devised whereby an intermittant mixture of different workpieces could be introduced into the system and moved from machine to machine for the performance of a work operation in a priority rated manner. The priority rate system must be flexible enough to enable the workpieces to be shuttled out of the priority rated system and moved through various machines in a newly established priority system to compensate for that contingency should some machine tool in the normal priority system be temporarily disabled. Such a manufacturing system would require a means for transferring workpieces of substantial size and weight from a systems loading point to the furthest reach of the system at a relatively fast rate and with maximum safety. The system provided for transferring these workpieces to the various work machine stations in the system must be adaptable to accommodate a change in the part size which may be progressed through the system. It was also found that any manufacturing system which would be of maximum utilization must provide some means whereby workpieces of various size and of various characteristics may be stored at the particular machine through which these workpieces will be progressed. This is necessary because in a priority rated system, the priority of any particular workpiece at any particular moment might change and therefore the storage must be capable of containing at least two or more different parts which may be automatically selected for advancement through the machine system.

SUMMARY OF THE INVENTION

According to this invention, a manufacturing system is provided with a plurality of different machine tools which are operably connected to be directly controlled by a computer. These machine tools are interconnected by means of a closed loop workpiece transfer system which is also controlled directly by the computer for advancing the workpiece from loading stations to particular machines in the system. The workpiece transfer system provided is a self-propelled vehicle guided throughout the system by means of a trackway. The vehicle is so designed as to accept workpiece pallets from the loading station and deliver these pallets to the entrance position of a selected machine station. At the entrance position of a selected machine station, the vehicle under computer direction will stop and the pallet with the workpiece will be moved off of the vehicle and onto an indexable table member which is capable of receiving and storing a plurality of different parts thereon. At the direction of the computer, the now empty vehicle will move on along the trackway or remain at rest until such time as the computer requires an empty vehicle at some other location.

The workpiece receiving and storage device associated with each machine station will be under the direction of the computer for indexing movement so as to present a priority selected workpiece into a position where it may be transferred into the work position of the machine tool. When the work operation on the workpiece has been completed, the computer will next direct the workpiece storage device to position the next priority rated workpiece into a position where it may be transferred to the work position of the machine tool while at the same time, moving the completed workpiece out of the work position of the machine tool and onto a waiting vehicle. The vehicle which receives the workpiece from the machine tool, will by direction of the computer, either position and locate the workpiece thereon at another machine tool where subsequent operations are to be performed; or will carry the finished workpiece to an unloading station where it will leave the system.

It is the general object of this invention to provide a manufacturing system capable of handling workpieces that vary in their physical geometry on a random basis and which are automatically advanced through the system under the direction of a remotely located computer.

It is another object of this invention to provide a manufacturing system capable of handling relatively large and heavy workpieces which are automatically advanced through the system under the direction of a remote computer.

It is a further object of this invention to provide a manufacturing system having a self-propelled vehicle workpiece transfer system which is directed in its operation by computer control.

It is a further object of this invention to provide a manufacturing system with a workpiece receiving and storage device capable of handling a plurality of different workpieces and maintaining them in storage until such time as directed by the computer to present a selected one of the stored workpieces in a position for transfer into the machine tool.

The foregoing and other objects of this invention, which will become more fully apparent from the following detailed description, may be achieved by the exemplifying apparatus depicted and set forth in the specification in connection with the accompanying drawings, in which:

DESCRIPTION OF THE DRAWINGS

FIG. 7 is a plan view of a car stop and pallet elevating device which is associated with each station;

FIG. 8 is a view partly in elevation and partly in vertical section through the vehicle stop device taken along the plane represented by the line 8—8 in FIG. 7;

FIG. 9 is a view partly in elevation and partly in vertical section of the workpiece storage and shuttle arrangement at station 23 taken along the plane represented by the line 9—9 in FIG. 2;

FIG. 10 is a fragmentary view in front elevation of the workpiece receiving and storage device of station 23 showing three pallet receiving sections;

FIG. 11 is an enlarged fragmentary view partly in elevation and partly in vertical section of the shuttle unit at station 23 showing details of the pallet transfer arrangement;

FIG. 12 is a view in elevation of the shuttle unit as viewed from the left in FIG. 11 with portions broken away to show the transfer mechanism;

FIG. 13 is an enlarged view of the left end grip actuator shown in FIG. 11, showing the position indicating switches and associated cam operator; and, FIG. 14 is an enlarged view of the right end grip actuator shown in FIG. 11, showing the position indicator switches and associated cam operator.

DESCRIPTION OF THE PREFERRED EMBODIMENTS

Figure 1:
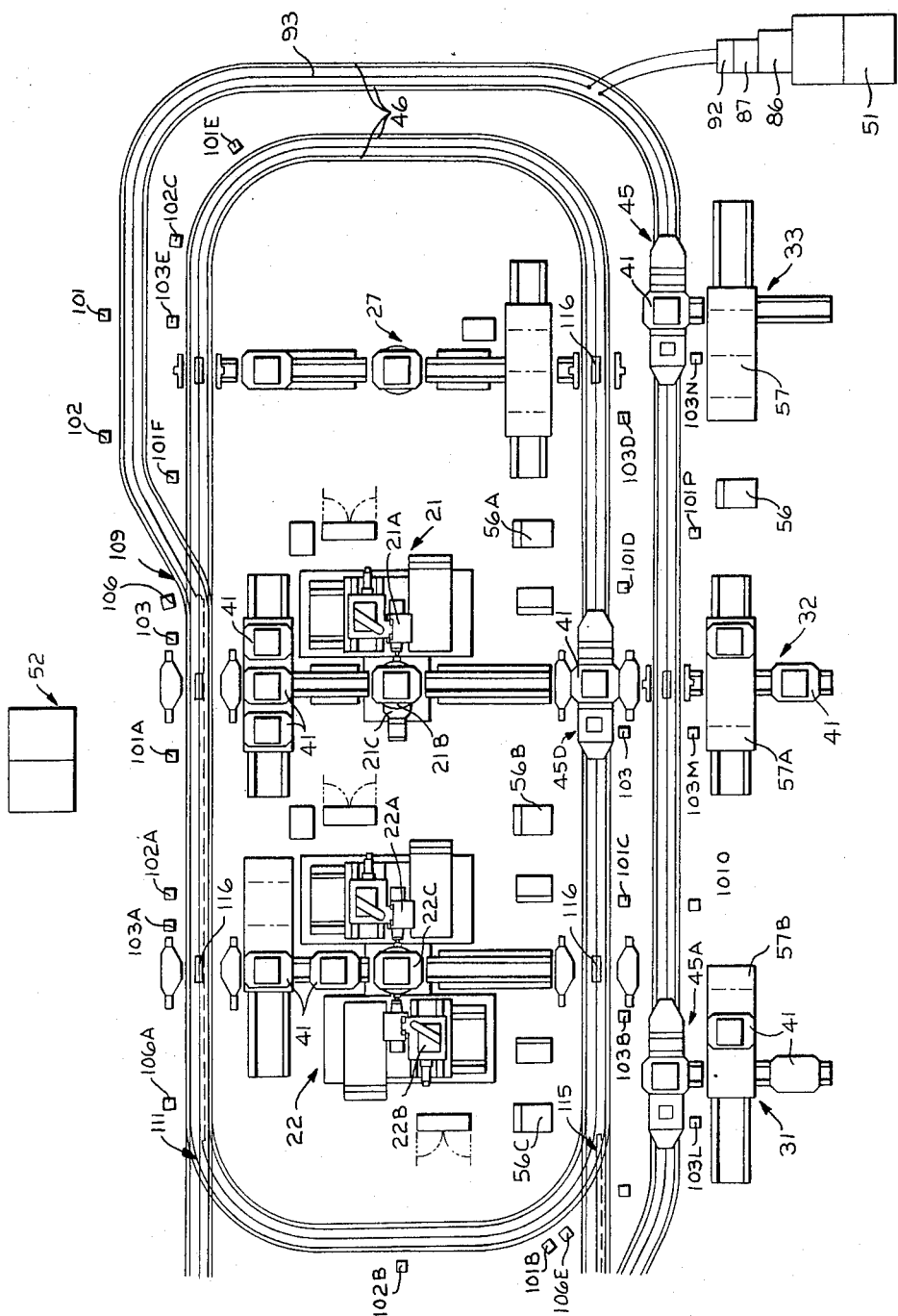
FIGS. 1 and 2 taken together is a schematic plan view of a manufacturing system incorporating the features of the present invention.
Figure 2:
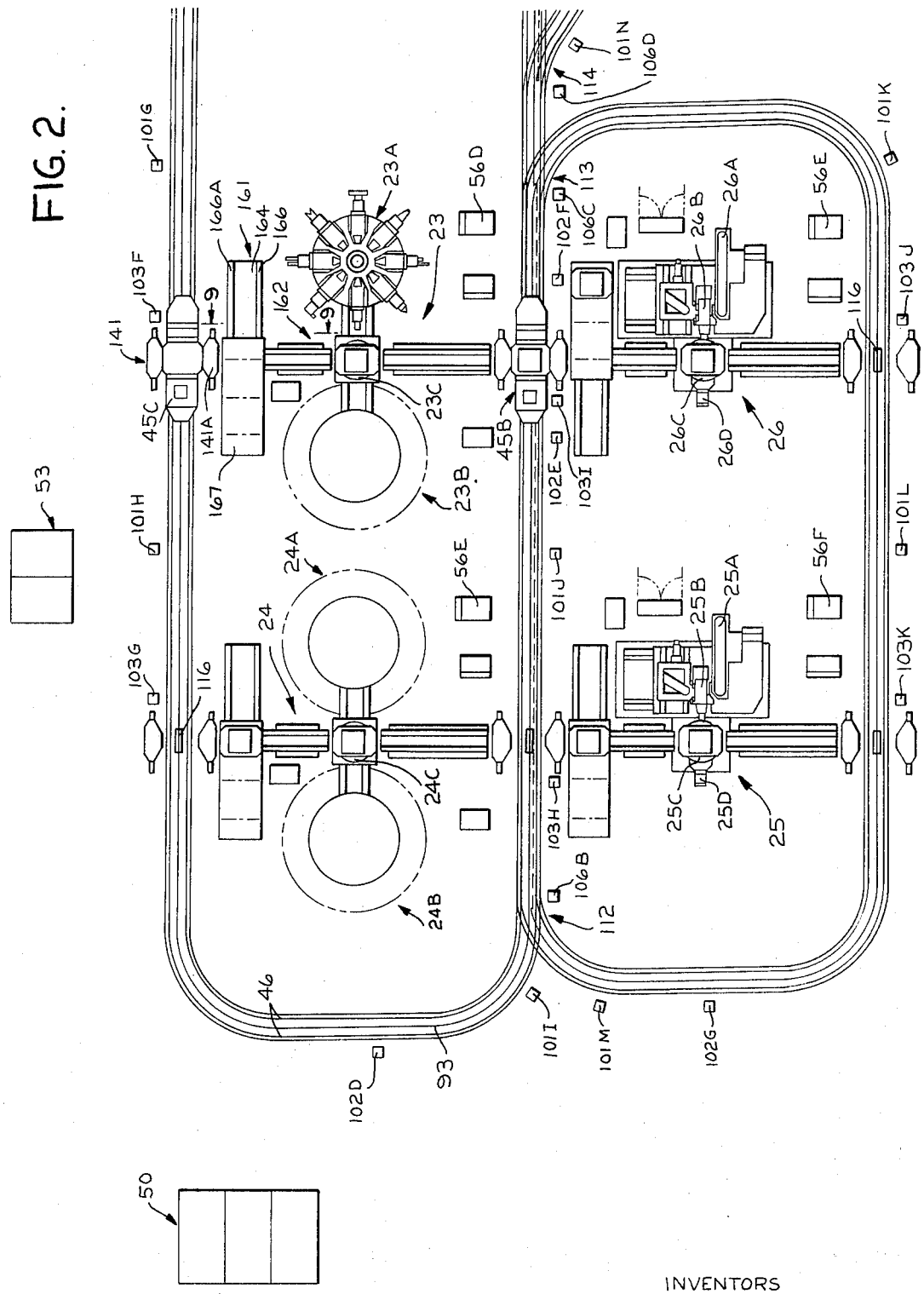

Reference is now made to the drawings and particularly to FIGS. 1 and 2 thereof, which taken together illustrate a manufacturing system in which the features of the present invention are incorporated. The manufacturing system comprises a plurality of work stations 21, 22, 23, 24, 25, 26 and 27 and a plurality of load and unload stations 31, 32 and 33. The work station 21 as herein shown comprises a multi-axis milling machine which is provided with a rotary work table 21B power driven by means of the motor 21C. The work station 22 comprises two multi-axis milling machines 22A and 22B spaced on either side of a rotary index table 22C. The work station 23 comprises two multi-spindle head changer machines 23A and 23B which are spaced on either side of a rotary table 23C that is arranged to move from a centered located position, as depicted in FIG. 2, either leftwardly or rightwardly as the case may be to advance a workpiece that may be carried on the table 23C to the work performing tool presented by either the multi-drill head changer machines 23A or 23B. The construction and operation of the work station 24 is similar to that of work station 23, so that the above description of the work station 23 also applies to the work station 24. Work station 25 comprises a machining center having a tool changer 25A with associated multi-tool storage magazine wherein a plurality of different tools may be interchanged with the spindle 25B for the performance of any desired work operation on a workpiece supported on a rotary table 25C which is driven by the motor 25D. The construction and operation of work station 26 is similar to that of work station 25 and the above description of work station 25 also applies to work station 26. The work station 27 is an auxiliary station which may be an inspection station, a manual work station or a washing station where the finished workpieces and the associated fixture pallets may be cleaned.

The loading and unloading stations 31, 32 and 33 are provided for inserting new workpieces into manufacturing system and for receiving finished workpieces that had been advanced through the system.

The workpieces are secured to fixtures which, in turn, are secured to pallets such as the pallets 41 shown in the loading stations 31 and 32 and on a transfer vehicle 45 which is located adjacent to the loading and unloading station 33. Throughout this specification, when the term pallet is used it will be meant to incorporate a work fixture with a workpiece thereon. The pallet 41 is moved out of the loading station 33 and onto a self-propelled vehicle 45 which is schematically shown in FIGS. 1 and 2 and in more detail in FIG. 3. The self-propelled vehicle 45 is moved around the system to locate a pallet 41 at a particular work station where the pallet with its workpiece will be removed from the vehicle and transferred into that particular work station. The vehicle 45 moves along a fixed pathway defined by a pair of tracks 46 which serve to support and guide the vehicle 45 in a closed loop path of travel to the various machining stations within the system.

The operation of the entire system including the transfer system is under the control of a supervisory computer 50, shown in FIG. 2, which is operable to store a large number of software routines which routines are associated with the individual workpieces that are to be progressed through the manufacturing system and which are related to a particular machine function. The supervisory computer 50 is connected to one or more satellite computers which in this particular case are three in number and identified by the reference numbers 51 and 52, shown in FIG. 1, and 53, shown in FIG. 2. The satellite computer 51 is connected to control the operation of the load and unload stations 31, 32 and 33; the operation of the transfer vehicles 45 which in the particular system shown, are four in number; operation of rail switches; operation of elevating mechanisms at each work station; and also initiates operation of shuttle mechanism at each work station. The satellite computer 52 is connected to control the operation of the work station 21, 22 and 27 so that all work operations at these stations may be performed on all the various workpieces that may be progressed through the system. The satellite computer 53 is connected to control the work stations 23, 24, 25 and 26 so that any and all work pieces progressed through these work stations will have the proper and desired work operations performed on them.

The load and unload stations 31, 32 and 33 are provided with an operator's unit more commonly referred to as a CRT unit for the presentation of control data so that an operator may transmit information to the supervisory computer 50 when a new workpiece is in a particular storage position on an indexable work table 57 shown associated with the load and unload station 33. The CRT unit 56 has a display unit on which the particular operation being executed under the control of the supervisory computer, is displayed for the benefit of the operator. The CRT unit 56 is also provided with information transmitting arrangement whereby the operator may communicate with the supervisory computer so that the logic functions of the supervisory computer may be updated as required.

As a different workpiece is ready to be placed on the indexable table 57 of the load and unload station 33, which workpiece would not be normally scheduled through that particular station, the operator through the CRT unit 56 would communicate the location of such unscheduled workpiece on the table 57 so that the supervisory computer may store this information in its memory for subsequent utilization when required. The work station 21 is likewise provided with a CRT unit 56A which serves both the work station 21 and the work station 27. The work station 22 comprises two machining units 22A and 22B and each unit is supplied with its own CRT unit 56B and 56C so that the function of each machine may be displayed simultaneously and communication with the supervisory computer 50 may be had from each unit. The work station 23, 24, 25 and 26 are each likewise provided with a CRT unit 56D, 56E, 56F and 56G, respectively. Thus, the desired function of any machine at any particular work station will be displayed to alert and keep the operator informed as to the progress of the workpiece in the particular station. It is also possible for the operator to communicate with the supervisory computer so that any change in the routine of work operations to be performed on a particular workpiece being progressed through a particular station may be changed at any time as the demand for such changes arises.

In the workpiece handling operation, the supervisory computer 50 is programmed to:

1. Select a part to be loaded onto vehicle 45 at the load and unload stations 31, 32 and 33.
2. Determines the destination of the particular part selected.
3. Keep track of a workpiece on each individual car.
4. Transmit the car number or identification function to the satellite computer 51 as an initial command to "go".
5. Keep track of parts and positions of the various workpieces in the system and in the storage areas.
6. Keep a running account of each car as it progresses in the manufacturing system so that when a car arrives at a particular station with a particular workpiece thereon, the supervisory computer will initiate a "stop" command to the satellite computer 51 for effecting the command "stop" of the vehicle.
7. Finally, the supervisory computer will issue command orders for the movement of the empty vehicle to another destination wherever an empty vehicle is required.

The satellite computer 51, on the other hand, will operate under the supervisory computer 50 and will operate to identify each vehicle, as it moves around the manufacturing system, at various control points or blocks and at each switching point and transmit the identifying information back to the supervisory computer 50. In addition, the satellite computer 51 will transmit vehicle command functions for slowing the vehicle down, operating the vehicle at a "creep" speed, ordering the vehicle to stop and under certain conditions to effect a go reverse command to move the vehicle in a reverse direction for auxiliary reasons outside of the normal movement. Satellite computer 51 will also relay information to the supervisory computer 50 as to position of all cars as they move around the manufacturing system. Under the direction of the supervisory computer 50, the satellite computer 51 will operate the various switches in the rail pathway 46 as required, from information obtained from the supervisory computer, and finally transmit whatever data is required by the supervisory computer.

Figure 3:
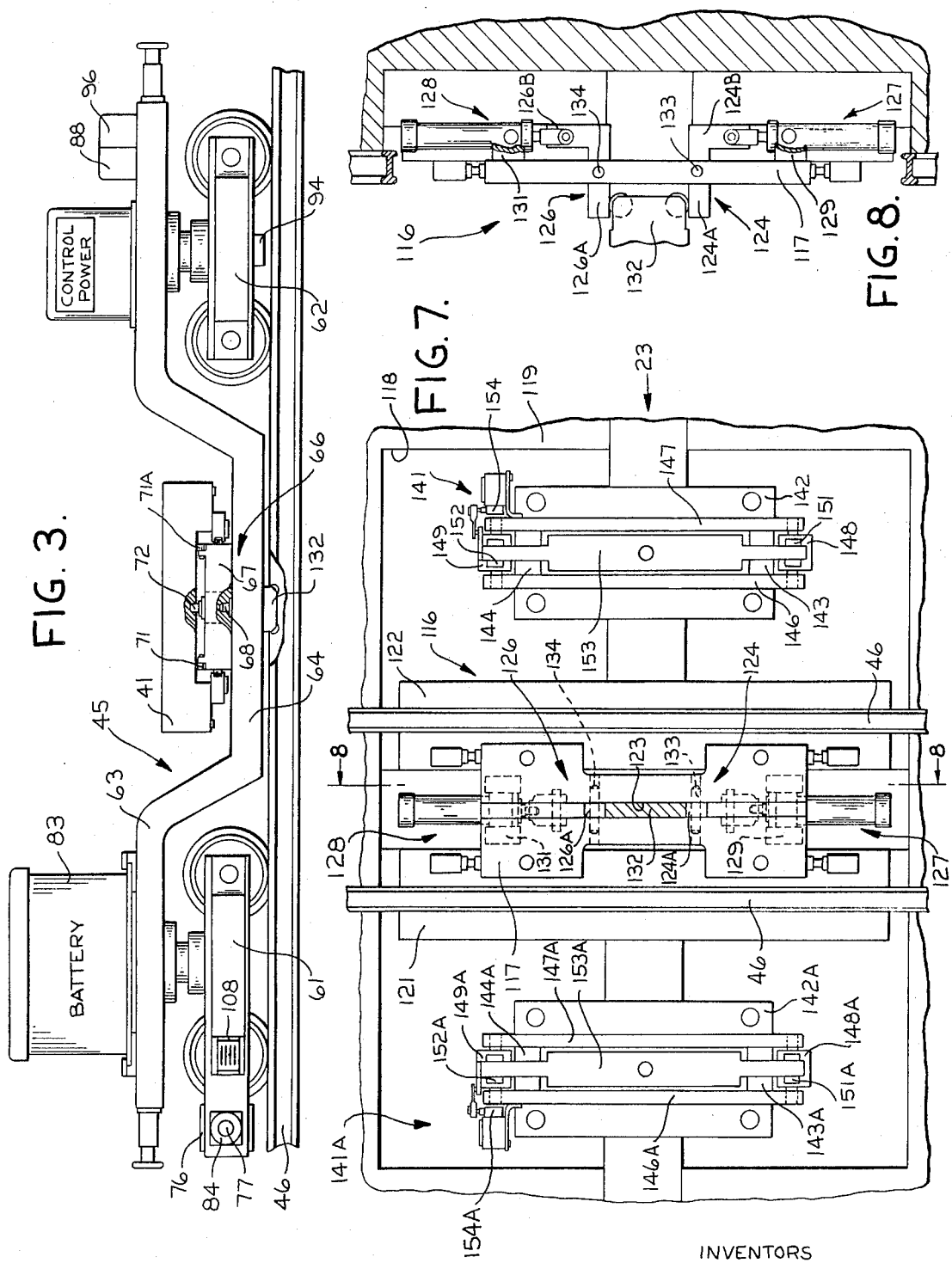
FIG. 3 is a view in right side elevation of a self-propelled vehicle for transporting workpiece around the manufacturing system.
Figure 4:
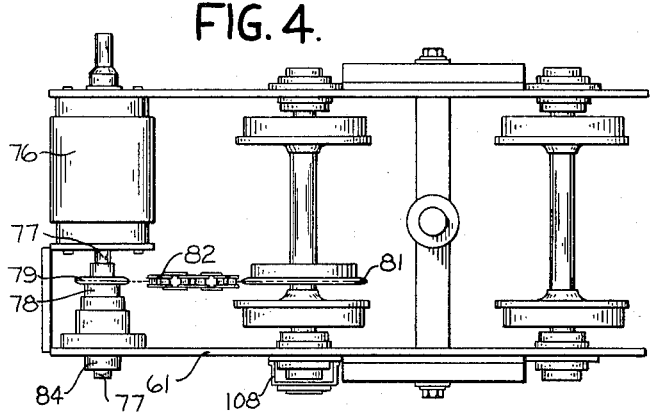
FIG. 4 is a plan view of the rear truck unit of a workpiece transport vehicle showing the power drive arrangement.
Figure 5:
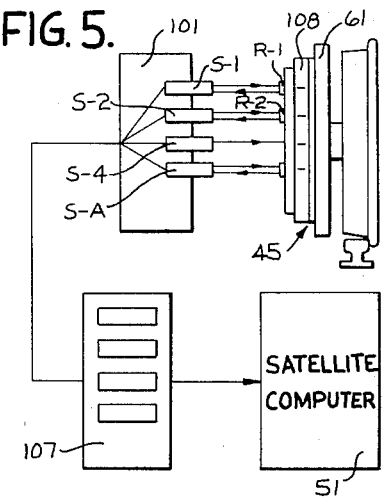
FIG. 5 is a diagrammatic view of an arrangement for identifying the workpiece transport vehicles.

As previously mentioned, the self-propelled workpiece transfer vehicles or cars 45, 45A, 45B, 45C and 45D are guided through the manufacturing system by means of space guide rails 46. The vehicles are all identical and the description of the vehicle 45 will apply to all vehicles in the system. As shown in FIGS. 3, 4 and 5, the vehicle 45 comprises a pair of wheeled truck members 61 and 62 which are pivotally connected at either end to a vehicle body 63 having a depressed central portion 64 wherein a workpiece pallet supporting structure 66 is mounted. The pallet support structure 66 comprises a pallet guide unit 67 which is maintained in place on the floor of the body portion 64 of the vehicle by means of a pair of spaced apart dowel members 68, one of which is shown in FIG. 3. Thus, the pallet carrier 67 is maintained in position on the floor of the platform 64 but is free to move vertically.

The pallet carrier 67 is provided with spaced apart roller guides 61 and 61A which extend across the pallet carrier 76 to give rolling support to the pallet 41 when it is moved in a transverse direction off of the vehicle 45 in either direction. For maintaining the pallet 41 on the pallet carrier 67, there is provided a centrally located pin 72 which is secured to and extends from the floor of the vehicle 45 and through a suitable opening 73 formed in the pallet carrier 67 to engage in a suitable opening in the pallet 41. Thus, the pallet 41 is maintained on the pallet carrier 67 by means of the pin 72 so that any swaying or tipping of the vehicle about its longitudinal axis will not cause the pallet 41 to roll off of the pallet carrier 67. Upon elevation of the pallet 41 relative to the platform 64 of the vehicle 45, the pallet 41 moving with the pallet carrier 67 is elevated relative to the stationary pin 72 and disengages from the pin so as to be free to move on the rollers 71 and 71A.

As previously stated, the vehicle 45 is self-propelled being driven by a commercially available brake motor 76 of well known construction. The motor 76 is supported between extentions of the frames of the truck unit 61 with its output shaft 77 being connected to drive a sprocket gear shaft 78 which is rotatably supported by a bearing bracket that is secured to the side of frame of the truck unit 61. The sprocket shaft 78 is provided with a sprocket gear 79 and is drivingly connected to a sprocket gear 81 that is secured to the rear axle of the truck unit 61. A drive chain 82, of well-known construction, is entrained about the gears 79 and 81 to effect a driving engagement between the gears for propelling the vehicle along the trackway 46. The motor 76 is of the reversible type and is energized by batteries contained within a battery case 83 and connected to supply direct current to the motor 76. An electrically energizable disc brake mechanism 84 of well known construction, is carried on the frame of the unit 61. The brake mechanism is mounted around the motor shaft 77 and upon being energized, operates to restrict rotation of the motor shaft 77 to stop the movement of the vehicle 45. On the other hand, when the brake is deenergized, the motor shaft 77 is released.

Figure 6:
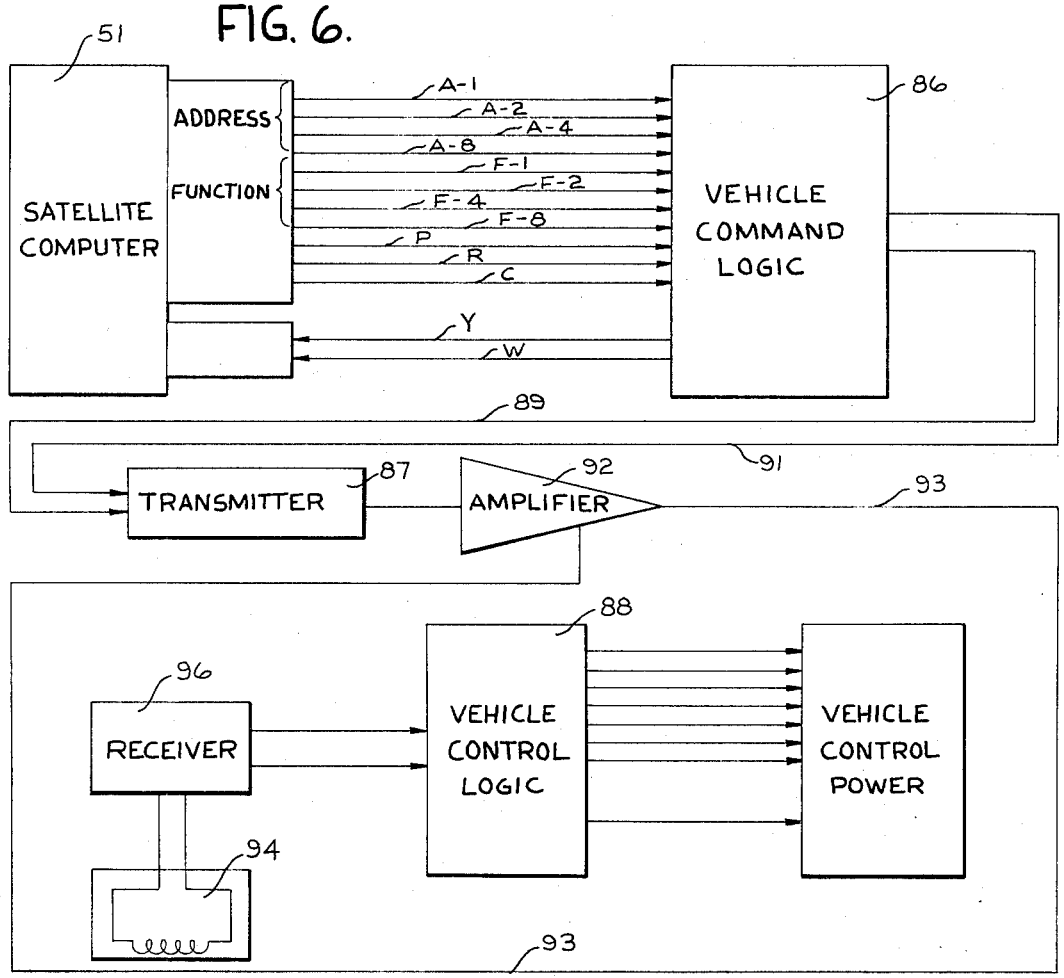
FIG. 6 is a schematic view of a control arrangement for regulating the operation of a workpiece transport vehicle.

Command from the satellite computer 51 to the vehicles 45, 45A, 45B, 45C, and 45D are coded in two four-bit binary groups. The first four bits, as shown in FIG. 6, will be the vehicle identification or address. Since the four bits represent four digits of a binary number, 15 different numbers can be identified by the four bits. In each case, as is well known, the coded identifying number comprises a summation or accummulative value of the individual values of the binary digits comprising the coded number. Thus, the vehicle command address transmitted from the satellite computer 51 via line A-1 will represent the vehicle number 1, while a vehicle command address transmitted via lines A-1, A-2, A-4 and A-8 would represent a vehicle number 15. However, since in the manufacturing system illustrated herein, only five vehicles are utilized, vehicle address commands will be transmitted via line A-1 to identify vehicle number 1, line A-2 to identify vehicle number 2, lines A-1 and A-2 simultaneously to identify vehicle number 3, line A-4 to identify vehicle number 4, and lines A-1 and A-4 to identify vehicle number 5.

In a similar manner, the second four-bit binary group will be signalled from the satellite computer 51 to command the particular functions required of the vehicles. Since a four bit binary group is provided for command functions, a total of fifteen functions could be commanded, however, in the present system only six such function commands will be needed for this system. Thus, the function command transmitted through the line F-1 to the car command logic will be a command for the vehicle to go-forward. The command function signal transmitted via lines F-1 and F-2 simultaneously, will be the command for the vehicle to creep-forward at a relatively slow rate. On the other hand, a command function signal transmitted via line F-4 will be a command for the vehicle to go-reverse at a relatively slow rate. A function command transmitted via the lines F-1 and the lines F-4 simultaneously will be a command for the vehicle to creep-reverse. Finally, a command function transmitted via lines F-2 and F-4 simultaneously will be a command function for the vehicle to stop.

The satellite computer 51 will output to the vehicle command logic 86, an 11-bit command in parallel. The voltage level may be at any desired voltage such as 12 volts, which will equal a one, while a zero volt will equal zero. The command signal will remain on until a signal from the vehicle command logic 86 is transmitted back to the computer to inform the computer that it has transmitted the data and is now ready to accept a new command. As previously mentioned, the first four bits of the command will be the vehicle address, while the next four bits represented by the lines F-1, F-2, F-4 and F-3 are the function command. The ninth bit represented by the line P in FIG. 6 will be a parity bit, while the tenth bit represented by the line R will be a "ready" signal command and finally the signal transmitted via line C will be the signal which turns on a transmitter 87. The transmitter ON signal will turn on the transmitter carrier frequency which activates a vehicle control logic system 88 that is associated with each individual car, as depicted in FIG. 3. The frequency ON signal transmitted by the satellite computer 51 is transmitted to the vehicle command logic system 86 via the transmission line C. From the vehicle command logic system 86 the transmitter ON signal is transmitted via the line 89 to the transmitter 87 for energizing the transmitter for operation.

The satellite computer 51 will receive one of two commands from the vehicle command logic system 86. One command from the vehicle command logic system 86 to the computer 51 is via the line Y which will indicate that the data from the satellite computer has been received and acted on and that the vehicle command logic system can now receive a new command from the computer. The other signal from the vehicle command logic system 86 would be a signal to indicate the lack of parity or incorrect data. This signal would be transmitted via the line W.

The vehicle or car command logic system 86 will scan the input from the satellite computer 51 as soon as the ready signal is received via line R. If parity does not exist or there is a wrong command, a wrong signal will be transmitted to the satellite computer 51. After the vehicle command logic system 86 has read and transmitted the command received from the satellite computer 51 it will generate a signal and transmit it via line Y to the computer that a new command can now be sent to it. The vehicle command logic system operates to transmit a pulse train signal in digital serial from at a 1KHZ rate to the transmitter 87 via the line 91. The transmitter 87 upon receiving the digital serial form of signal will operate to shift the carrier frequency up or down. The output of the transmitter 87 will go to a power amplifier whose output will be transmitted to a wire 93 which is located in the floor between the track 46 as indicated in FIGS. 1 and 2 and diagrammatically illustrated in FIG. 6.

The amplifier output in the wire 93 will be sensed by a magnetic pickup 94 which is carried below the front truck unit 62 of the vehicle 45, as shown in FIG. 3. The magnetic pickup 94 will generate a voltage at the same frequency as the transmitter output and this voltage will be fed to a receiver 96 located on the front portion of the car 45. The receiver 96 will be tuned to the same frequency as the transmitter 87. The output of the receiver 96 will be a pulse train identical to the output of the car command logic system 86 and this pulse train will be fed to a car control logic system 88.

Decoding of the pulse train signal received from the receiver 96 will be effected by the vehicle control logic system 88 which will also operate to store the decoded signal. The vehicle control logic system 88 for each car will operate to decode the address command and the function command that will be transmitted from the vehicle command logic system 86. Therefore, only the car whose address or identification coincides with the commanded address will act on the commanded function transmitted by the vehicle command logic system 86. All other vehicles will continue in the same mode in which they were in prior to the newly transmitted command signal. Each car 45 will have a binary coded switch which will establish the address for that particular car. When an address command transmitted from the vehicle command logic system 86 coincides with the particular address of the binary coded switch on the vehicle, that vehicle will then be conditioned to act upon the commanded function that is being transmitted. Thus, each vehicle will identify the address signal and will act only when such address coincides with its own particular address and will function then under the command function being initiated and all other vehicles will operate as they had been operating.

Identification of the cars 45 are made along the rail system 46. A car must be identified as it approaches a work station and also at the station. In addition, the cars must actuate an "in position" switch when it is in position at the station. The cars 45 are also identified prior to reaching a junction point so that a rail switch may be aligned to direct the car along the desired pathway. For the purpose of identifying vehicles, an identifying scanner unit 101 comprising four co-axial photoelectric scanners are mounted at the various identification points to be operated at the same time as a car travels past these switches. To identify the car, each car is provided with reflective target plates depending upon the address or identification of the particular car. As shown in FIGS. 3 and 5, retroreflective plates are secured in vertically spaced relationship on a bracket 108 that is secured on the journal box of the rear axle of the truck unit 61. The four photo-electric scanners are mounted horizontally in a vertical column in boxes of the units 101 that are disposed in strategic locations as required. These scanners are commercially available units and each feed an amplifier which is associated with the solid state logic output unit 107. Assuming that the vehicle 45 is identified by the number 3, there would be two reflecting plates R-1 and R-2 which would be positioned on the bracket 108 associated with the vehicle 45 in position to receive and reflect back a light beam from scanners S-1 and S-2 of the four scanners mounted in the box 101. Thus, in FIG. 5 the fragment of the truck unit 61 shown therein is associated with the vehicle 45 which is identified as vehicle number 3. As shown in FIG. 5, the bracket 108 is marked with three-bit positions at which positions the retroreflector plates are mounted so as to be in position to receive the light beams of the photo-electric scanners S-1, S-2 and S-4 in the box 101 located adjacent to the track 46. Since the particular vehicle indicated is identified as number 3, the retroreflective plates are mounted in the first two-bit positions and are identified by the reference numerals R-1 and R-2. Since each bit position represents one digit of a three digit binary number, the presence of a retroreflective plate in a bit position will indicate a numeral 1 for that particular digit of the binary number. The absence of a retroreflective plate in a bit position, will indicate a 0 for that particular digit. Thus, with the retroreflective plate R-1 in the bit position 1 and a retroreflective plate R-1 in bit position 2 and no plate in bit position 3, the binary number obtained will indicate car or vehicle number 3. Thus, as the vehicle 45 moves along the track 46 on the outside loop thereof and reaches the position of the scanner box 101 in moving past this box the scanners S-1 and S-2 will be actuated to indicate that car number 3 is passing that particular scan point in the system. The scanners S-1 and S-2 upon being actuated will transmit the signal to the amplifier 107 and the identification signal will be relayed from the amplifier 107 to the satellite computer 51. If the vehicle identified as number 3 is carrying a workpiece that is to be advanced through the work station 21, the satellite computer 51 will generate a creep-forward command to vehicle address number 3. When scanners in "in position" scanner box 103, located at the track position adjacent the station 21, identifies the vehicle upon its arrival at the station, a stop command function will be transmitted to stop the vehicle in position at station 21.

Assuming now that the workpiece carried by vehicle number 3 is not to be worked on at the work station 21, but is scheduled for a work operation at the work station 23. Under this condition, the vehicle number 3 will pass scanner identification point 101. Since the satellite computer 51 does not have programmed instructions from the supervisory computer 50 for stopping the vehicle number 3 at the station 21, the vehicle will continue to move along the track 46. As the vehicle number 3 passes rail switch identification point 102. the track switch 109 will be aligned to allow the passage of the vehicle through the switch as previously described. Vehicle number 3 will continue on passing through work station 21 and the various identification points such as the stations 101A and 101G with this information being relayed back to the satellite computer 51. Thus, when vehicle number 3 arrives at the identification switch 101G, the scanners therein are actuated to inform the satellite computer 51 that the vehicle is approaching station 23. The satellite computer 51 has been programmed to stop the vehicle when it arrives in position adjacent the work station 23.

As the vehicle identified as vehicle number 3 moves past the identifying scanning position 101 it will move on and pass a rail switch identification scanner 102 which immediately relays this information back to the satellite computer 51. The computer 51 scans its memory and recognizes the fact that the switch leading into the main line section must be aligned to receive the vehicle and generates a command to the track control 106 so that the track switch 109 will be moved to allow the vehicle to pass into the main line section of the guide pathway. The vehicle will move through the work station 21 passing the identification point 101A and move on past rail switch identification point 102A which immediately transmits the information to the satellite computer 51 which again recognizes the fact that the vehicle number 3 is to move along the main line and so immediately generates a command to track control 106A for aligning the switch 111 for main line vehicle travel so the vehicle number 3 may pass along the trackway towards the work station 23.

Assuming now that the vehicle number 3 carries the workpiece which is scheduled for operation at the work station number 23. When the vehicle identified as number 3 arrives at the position adjacent the identifying unit 101G, shown in FIG. 2, the photo-electric scanners S-1 and S-2 within the unit 101G will be actuated to identify the vehicle. The identification will be relayed to the computer 51 which scans its memory and recognizes that vehicle number 3 is to be located at work station 23. The computer immediately transmits the vehicle address signal and the creep-forward command signal to the vehicle command logic system 86. The vehicle command logic will transmit both the vehicle address signal and the creep-forward command function to all vehicles in the manufacturing system. However, only the particular vehicle whose address or identification corresponds to the address being transmitted will act on the command function which is also being transmitted. Since in the particular example set forth, it is vehicle number 3 that has been identified and is also the desired vehicle, its control logic 88 will respond to effect the operation of the motor 76 at a creep rate. Therefore, vehicle number 3 will move on towards the work station 23 at a creep rate. When vehicle number 3 arrives at the position adjacent the work station 23 another in position scanner unit 103F will be actuated to again identify the vehicle and also to have an auxiliary scanner S-A actuated. These signals are transmitted to the satellite computer 51 where coincidence of recognition is again obtained and with the auxiliary scanner S-A actuated, the satellite computer 51 will immediately operate to transmit a stop command function to the logic system of the vehicle which, in turn, operates the vehicle control power system to stop the operation of the motor and operate the brake mechanism 84 so that the vehicle will stop in position at the work station location 23. At the same time, the satellite computer 51 will initiate operation of a positive stop mechanism 116 for locating and holding the vehicle number 3 in the station 23.

The stop mechanism 116 in each of the work stations and also in the loading and unloading stations are identical. Therefore, a description of the stop mechanism 116 associated with the station 23 will apply to all stop mechanisms. As shown in FIGS. 7 and 8, the stop mechanism 116 comprises a plate 117 which is disposed between the rails 46 in a recess 118 formed in the supporting floor 119. The plate 117 is supported on plates 121 and 122 which are bolted or secured to the floor portion of the recess 118. The plate 117 is provided with a longitudinally extending slot 123 in which a pair of stop members 124 and 126 are pivotally supported. The stop members 124 and 126 are L-shaped members having vertical finger portions 124A and 126A in horizontally extending finger portions 124B and 126B. The finger portions 124B and 126B have a pivotal connection with the extending ends of piston rods associated with hydraulic cylinders 127 and 128 respectively. The hydraulic cylinders 127 and 128 are each pivotally secured to depending brackets 129 and 131 that are formed on the underside of the supporting plate 117.

With the fingers 124A and 126A of the stop members 124 and 126 in the vertical upright position as depicted in FIGS. 7 and 8, they will be in position to engage on opposite sides of a depending lug 132 which is secured to the underside of the vehicle 45 as depicted in FIG. 3. With the lug 132 trapped between the vertical extending fingers 124A and 126A of the stops 124 and 126, the vehicle will be located in an exact position at the station so that transfer of the pallet 41 may be made into the machine station 23. In order to release the vehicle, the finger members 124A and 126A of the stops 124 and 126, must be pivoted into a horizontal position so that they no longer engage on either sides of the depending lug 132. In order to effect the pivotal movement of the fingers 124A and 126A to a horizontal position fluid pressure is admitted to the head end of the cylinders 127 and 128, forcing the rods of the pistons outwardly thereby effecting the pivotal movement of the fingers 124A and 126A respectively about pivot pins 133 and 134 respectively.

In operation, the vehicle number 3 which has been identified as the vehicle carrying the desired workpiece for station 23, the satellite computer 50 will effect the operation of the cylinder 127 by admitting a fluid pressure to the rod side of the piston thereof to retract the rod within the cylinder to pivot the stop member about pin member 133 moving the finger 124A into a verticle stop position. As the signal command function from a satellite computer is relayed to the car control logic for operating the car control power to reduce the speed of the vehicle to a creep rate, the car will move at a relatively slow rate into the station 23 so that the depending lug 132 engages against the upright finger 124A of the stop member 124. As the lug 132 impacts against the vertical upstanding finger 124A the impact thereof will cause a pressure differential to incur on the rod side of the piston in the cylinder 127 so that a pressure switch (not shown) of well-known commercially available type will be actuated. Actuation of the pressure switch (not shown) will operate to have pressure fluid admitted to the cylinder 128 at the rod side of the piston therein, so that the rod associated with the cylinder is retracted within the cylinder thereby effecting the pivotal movement of the stop member 126 about the pivotal pin 134 to move the stop finger 126A into the vertical position to thereby effectively lock the depending lug 132 between the two vertical fingers 124A and 126A.

With the vehicle number 3 located in position for transfer of the pallet and workpiece into the work station 23, the pallet carrier 67 must be elevated off of the floor of the vehicle to locate the roller guide 71 and 71A in alignment with the guideways of the station 23. To effect such elevation of the pallet carrier 67 and the pallet 41, there is provided on either side of the track 46 a pair of elevating mechanisms 141 and 141A that are operable to engage the under surface of the pallet carrier 67 on either side thereof to lift the pallet carrier off of the vehicle floor. The elevating mechanism 141 and 141A are identical and a description of the elevating mechanism 141 will apply to the mechanism 141A. The elevating mechanism 141 comprises a plate member 142 which is secured to the floor of the recess 118 adjacent to an associated rail 46. Upstanding from the ends of the plate member 142 are a pair of post members 143 and 144. A pair of bar members 146 and 147 are bolted to each side of the upstanding post members 143 and 144. A pair of hydraulic cylinders 148 and 149 are pivotally secured between the spaced apart ends of the cross members 146 and 147. The outer end of a piston rod associated with each of the hydraulic cylinders 148 and 149 are each provided with a clevis 151 and 152 respectively. The clevises 151 and 152 receive the reduced ends of a bar member 153 that is disposed between the cross beam members 146 and 147. Each of the elevating mechanisms 141 and 141A, as previously mentioned, are spaced on either side of the trackway 46 in position to engage the under surface of the pallet carrier 67 on the vehicle when it is located at a station. The hydraulic cylinders 148 and 149 of the elevating mechanism 141, and the hydraulic cylinders 148A and 149A of the elevating mechanism 141A are arranged so as to be energized simultaneously to effect the outward upward movement of their associated piston rods, thereby elevating the horizontally movable bar members 153 and 153A into engagement with the under surface of the pallet carrier 67, thereby lifting the pallet carrier and the pallet off of the vehicle up to the level of the transfer line of the station 23. When the mechanisms 141 and 141A have operated to their position of extention, limit switches 154 and 154A will be actuated to provide a signal for indicating that the pallet is in position. With both of the limit switches 154 and 154A actuated, a signal will be provided to the satellite computer 51 to indicate that the pallet on the car is ready for transfer.

The work station 23 is provided with a workpiece receiving and storage unit 161 which is disposed parallel to the trackway 46 in position to receive the pallet from a vehicle 45 when a vehicle is located at the transfer position of the work station 23. Extending transversely from the unit 161 towards the work area of the station 23 is a shuttle arrangement 162. The construction and operation of these units are the same for all work stations and the description given for the units 161 and 162 at the work station 23 will be applicable to all the units associated with the individual work stations throughout the manufacturing system.

The receiving unit 161 comprises a base 164 which presents a pair of horizontally disposed roller guideways 166 and 166A which supports a carriage 167 as shown in FIGS. 9 and 10. The carriage 167 is supported for rolling movement on the base 164 by means of a plurality of spaced apart roller supports 168, 168A and 168B. The roller supports 168, 168A and 168B are disposed directly underneath a pallet supporting structure formed on the carrier 167. The supporting structures define pallet receiving positions 171, 172 and 173 in which pallets received from the vehicles may be disposed and stored for subsequent utilization at the work stations. The receiving positions 171, 172 and 173 are identical and the structure described for the position 172 will apply to all of such structures. The pallet supporting structure at the receiving position 172 comprises a pair of spaced apart upstanding plate supports 174 and 174A. The supports 174 and 174A each received a transversely extending plate member 176 and 176A respectively, which are bolted or otherwise secured to the top surface of the upstanding supports 174 and 174A. Each of the plate members 176 and 176A present a plurality of spaced apart rollers 177 which are carried on the top surface of the plates and which gives rolling support to a pallet indicated by the reference letter 41–B, as shown in phantom lines in FIG. 10. Each pallet 41 such as the pallet 41–B shown in the position 172 on the carriage 167 is provided with a pair of spaced apart transversely extending plate members 178 and 178A which are secured to the underside of the pallets. The plate members 178 and 178A each present a plurality of rollers 177 and 177A, which engage on the sides of the plate members 176 and 176A, respectively, and serve to restrain the pallet from shifting longitudinally. To indicate to the supervisory computer 50 that a pallet is in a particular receiving position, each receiving position 171, 172 and 173 is provided with a switch 171A, 172A and 173A respectively, each of which are actuated by means of a dog 171B, 172B and 173B respectively, secured to the under surface of the plate members 178 and 178A associated with each pallet.

When the carriage 176 is in position wherein one of the receiving stations 171, 172 or 173 is located in direct alignment for transfer to the work station 23 of the machine therein, which is hereinafter referred to as the shuttle transfer position, indicated by the arrow in FIG. 10 and identified with the identification number 23S, a dog 181 secured to the side of the carriage 176 at the mid-point of the receiving position 172 will actuate one or the other of three limit switches 182, 183 or 184. When the receiving position 172 is in the position of shuttle, indicated by the arrow identified with the reference numeral 23S, the dog 181 will actuate the switch 183 to indicate that the receiving position 172 is at the shuttle position. However, should the receiving position 173 be located at the shuttle position, the dog 181 moving with the carriage would be in position to actuate the switch 182, to indicate that the receiving position 173 is at the shuttle position 23A. On the other hand, if the carriage had been shifted rightwardly as viewed in FIG. 10 to locate the receiving position 171 at the shuttle position 23S, the dog 181 would actuate a switch 184 to indicate to the supervisory computer 50 that the receiving position 171 was located for either receiving a pallet from the carriage or for the transfer of the pallet along the shuttle into the machine.

For effecting the positioning movement of the carriage 167 for locating a particular pallet position at the shuttle position, there is provided a fluid actuator 156. The fluid actuator 156 comprises a cylinder 156A which is secured to internal webs within the base 164. A piston rod 156B extends outwardly from the cylinder 156A and has its extreme outer end connected to a bracket 157. The bracket 157 is secured to the under side of the carriage 167. With the carriage 167 located in a mid-position on the base 164 wherein the pallet receiving position 172 is located in the shuttle aligned position 23S a pair of locking devices 158 and 159, which are secured to base bracket 160, are operated so that associated rods 158A and 159A, respectively, are moved upwardly to a position on each side of the bracket 157, thereby locking the carriage in its mid-position on the base 164. When it is desired to move the carriage 167 leftwardly to locate the pallet position 173 at the shuttle position 23A, the stop mechanism 158 is operated to retract its associated rod 158A. Thereupon the fluid actuator 156 is operated to effect leftward movement of the piston rod 156B, as viewed in FIG. 10. The carriage 167 will move leftwardly until such time as the dog 181 actuates the switch 182. With the switch 182 actuated, the operation of the fluid actuator 156 will be discontinued. Assuming now that it is desired to move the carriage 167 rightwardly from the position it occupies in FIG. 10, to locate the pallet position 171 in the shuttle position 23S. Under this condition, the stop mechanism 159 is operated to effect the retraction of its associated rod 159A. At this time, the stop mechanism 158 is operated so that its associated rod 158A is maintained in extended position. With the rod 159A retracted, the fluid actuator 156 is operated to effect rightward movement of the carriage 167. when the carriage arrives at a position wherein the pallet position 171 is located at the shuttle position 23S, the dog 181 will actuate the switch 184. With the switch 184 actuated, operation of the fluid actuator will be discontinued, locating the pallet position 171 at the shuttle position 23S.

For shuttling the pallet from a vehicle 45 located at the station 23 into the receiving position of the receiving and storage member 161 or for moving the pallet off the receiving support and into the machine proper, along the shuttle line, the shuttle unit 162 is provided with the unique shuttle mechanism. As shown in FIGS. 9, 11 and 12, the shuttle unit 162 comprises a fabricated bed structure 186 having a top horizontal plate 187 on which is secured a fluid cylinder mechanism 188 so as to be immovable relative to the bed structure 186. The fluid cylinder 188 is provided with the usual internal piston arrangement (not shown) to which a piston rod 189 is secured for movement with the piston. The rod 189 extends outwardly of the cylinder 188 in a leftwardly direction, as viewed in FIG. 9, and has its extreme outer end secured in a depending bracket 191. The bracket 191 is secured to the under surface of a slide 192 which is supported for longitudinal movement relative to the bed 186 in suitable guideways 194 and 194A, as shown in FIG. 12, for movement toward and away from the pallet receiving and storage device 161 and work table 23C of the work station 23. Another cylinder 196 is secured to the top surface of the slide 192 so as to be movable with the slide. The cylinder 196 is likewise provided with a piston (not shown) which is also provided with a piston rod 197 which extends outwardly of the cylinder 196 rightwardly thereof. The extending end of the rod 197 is secured to a bracket 198 which is secured to and depending from a pallet grip carrier 199. The pallet grip carrier 199 comprises a pair of longitudinally extending spaced bars 201 and 202 which are secured together in spaced relationship by means of end brackets 203 and 204. The bars 201 and 202 are slideably supported in laterally extending guides 211 and 211A which are attached to roller plates 212 and 212A as shown in FIG. 12. Upstanding from each of the plates 212 and 212A are roller supports 213 and 213A which receive the bearing shafts (not shown) of a plurality of supporting rollers 214 and 214A respectively. As depicted in FIG. 9, the top surfaces of the rollers 214 are in the same plane as are the rollers 177 associated with each of the pallet receiving positions of the table 167. Thus, when the receiving position is located in alignment with the shuttle mechanism, a pallet in a receiving position on the carriage 167 will be supported on the rollers 177A and 177 thereof at a level for smooth transfer to the rollers 214 and 214A of the shuttle mechanism 162.

The pallet grip carrier 199 is provided on opposite ends with a bifurcated grip 221 and 222. The bifurcated grip member 221 is secured for pivotal movement to the extending end of the drive shaft 223 of the fluid actuator 224 secured between the spaced bar members 201 and 202 of the carrier 199. Similarly, the bifurcated grip 222 is likewise secured for pivotal movement on the end of the shaft associated with another fluid actuator 227, also carried between the bar members 201 and 202 of the carrier 199.

Assuming now that a desire to operate the shuttle unit 162 for moving the pallet 41-D leftwardly, as viewed in FIG. 9, from the position it occupies on the shuttle unit 162 onto the table 23C of the machine station 23. To this end, a pair of stop units 231 and 232 each comprising a piston and cylinder mechanism, having stop rod extentions 233 and 234, respectively, which extend outwardly of the cylinders, are operated so that the stop rods 233 and 234 are disposed on either side of the bracket 191 to maintain the piston rod 189 in the mid-position it occupies as shown in FIGS. 9 and 11. With the piston rod 189 locked in its mid-position, the cylinder 196 is energized to effect the rightward movement of its associated rod 197 its full limit of travel. With the rod 197 moved to its full rightward limit of travel, the grip slide 199 moving with the rod 197 will be located so that the pallet engaging grip 221 is in a position below the trailing edge of the pallet 41-D, as viewed in FIG. 9. The hydraulic grip actuator 224 will be energized to effect the pivotal movement of the grip 221 from its retracted position into position wherein the bifurcated fingers of the grip 221 engage on either side of a bar 236 which is attached to the trailing edge of the pallet 41-D. With the grip 221 in engagement with the bar 236, the stop mechanism 231 is actuated down to release the piston rod 189 for leftward movement. At this time, both the cylinder 188 and 196 are energized so that fluid pressure is admitted to the head end of the cylinder 188 and to the rod end of the cylinder 196. This will cause the rod 189 to move leftwardly and at the same time will effect the retraction of the rod 197 within its associated cylinder 196. The leftward movement of the rod 189 will effect the leftward movement of the slide 192, thereby moving the cylinder 196 with it. Thus, the slide 192, cylinder 196 and grip carrier slide 199 will be moved leftwardly a distance equal to the distance that the rod 189 is free to move leftwardly. With this action, the pallet 41-D is moved leftwardly to the edge of the shuttle rollers of the unit 162. However, as previously mentioned, the rod 197 was also moved leftwardly into a retracted position within the cylinder 196. Thus, this additional operation of the cylinder mechanism 196 will effect the full movement of the pallet 41-D off of the shuttle mechanism 162 and into position on the table 23C of the machine at the work station 23. With the transfer of the pallet 41-D completed, the finger 221 is pivoted into its retracted position and the cylinder is deenergized so that the piston rod 197 is retained in its retracted position within the cylinder 196. However, fluid pressure is admitted to the rod side of the piston within the cylinder 188 to effect retraction of the rod 189. At this time, the stop mechanism 232 has been actuated so that the stop 234 is in extended position in the path of travel of the bracket 191 so that upon retraction of the rod 189 it will engage against the stop 234 when it arrives at its mid-point position, which it occupies in FIGS. 9 and 11. With the rod 189 retracted to its mid-point position, the stop mechanism 231 is again actuated to effect the upward movement of the stop 233 into a blocking position whereupon the bracket 191 is locked between the two extended rods 233 and 234.

Assuming now that it is desired to move the pallet 41-B off of the receiving and storage carriage 167 into position on the shuttle unit 162. To effect the movement of the pallet 41-B off of the carriage 167 and onto the shuttle 162, both of the stop mechanisms 231 and 232 are actuated to position their rods 233 and 234, respectively, in their uppermost position, thereby locking the rod 189 in its mid-point position, depicted in FIGS. 9 and 11. With this condition existing, fluid pressure is admitted to the head side of the cylinder 196 to move the rod 197 a full limit of rightward travel. With the rod 197 extended rightwardly its full limit of travel, the right bifurcated grip 222 is pivoted from its retracted position to its upright position to engage with a bar 237 attached to the trailing or rightward edge of the pallet 41-B. Thereupon, fluid pressure to the head end of the cylinder 196 is discontinued and fluid pressure is admitted to the rod side of the cylinder to effect a retraction of the rod 197 moving the grip slide 199 with it. This movement operates to move the pallet 41-B partially off of the carriage 167 and onto the shuttle unit 162 but not in centered position thereon. The distance that the pallet 41-B will be moved is equal to the stroke of the rod 197 which in this particular case will place the pallet 41-B partially onto the unit 162 but not in a centered position. With the pallet 41-B now partially on the unit 162, the stop 232 is operated to retract the stop 234. Also, the fulid actuator 227 associated with the grip 222 is operated to pivot the grip out of engagement with the bar 237. With these conditions obtained, fluid pressure is admitted to the rod side of the cylinder 188, thereby effecting the inward movement of the rod 189 its full limit of rightward travel. The rightward movement of the rod 189 will cause the slide 192 and thereupon the cylinder 196 and the associated pallet grip slide 199 to move with it to the right. The distance in which the grip slide 199 is moved rightwardly is the distance which is equal to the rightward stroke of the rod 189 from its mid-point position. This distance being sufficient to place the left grip 221 in position beneath a bar 237A which is attached to the front edge of the pallet 41–B. With the grip 221 located adjacent the bar 237A, the actuator 224 is operated to effect a pivotal movement of the grip 221 into engagement with the bar 237A. Thereupon, fluid pressure is discontinued to the rod side of the cylinder 188 and admitted to the head side of the cylinder 188. Thereupon the rod 189 will be moved leftwardly outwardly of the cylinder 188 and will continue to move until the bracket 191 abuts against the extended stop 233 of the stop mechanism 231. With the rod 189 moved its full travel to its mid-point position against the stop 233, the stop mechanism 232 is actuated to move its stop 233 upwardly, thereby effectively locking the rod 189 in its mid-position that it occupies, as depicted in FIGS. 9 and 11. With this movement completed, the pallet 41–B will have been moved leftwardly an additional amount equal to the stroke of the rod 189 in its leftward movement. This will position the pallet 41–B in a centered position on the unit 162. With the pallet located in the exact position on the unit 162, the actuator 224 is operated to pivot the grip 221 out of engagement with the bar 237A.

Assuming now that it is desired to move a pallet 41–E off of a vehicle located in transfer position adjacent the work station 23 onto a receiving position on the storage and receiving table 167, where it will be available for subsequent movement into the machine 23. To effect such movement of the pallet 41–E, the stop mechanism 232 is actuated to effect retraction of the stop 234 to free the rod 189. Thereupon the fluid pressure is admitted to the cylinder 188 at the rod side thereof to effect the rightward movement of the rod 189, causing the slide 192, the cylinder 196 and the grip carrier 199 to move with it rightwardly a distance equal to the rightward stroke of the rod 189. simultaneously with the energization of the cylinder 188, fluid pressure is also admitted to the cylinder 196 at the head side thereof to effect a rightward extending movement of its associated rod 197 to move the grip carrier 199 rightwardly a distance equal to the distance that the rod 197 will move. With both the cylinders 188 and 196 operated as described, the bifurcated grip 222 will be located beneath a bar 238A attached to the front edge of the pallet 41–E. The fluid actuator 227 is then energized to effect a pivotal movement of the grip 222 from its retracted position into an upright engaged position in which it engages the bar 238A. With the grip 222 in engagement with the bar 238A, fluid pressure is discontinued to the head side of the cylinder 196 and admitted to the rod side thereof to effect a retraction of the rod 197 within the cylinder moving the carrier 199 leftwardly a distance equal to the stroke of the rod 197, thereby moving the workpiece pallet 41–E off of the carriage 67. Simultaneously therewith, fluid pressure to the rod side of the cylinder 188 is discontinued and fluid pressure is admitted to the head side of the cylinder thereby effecting leftward outward movement of the rod 189 which will move to its mid-point position where it will engage against the extended stop 233 of the stop mechanism 231. This double movement will operate to effect the movement of the pallet 41–E off of the transfer vehicle and into the storage position of the table carrier 167 where it will be available for subsequent transfer to the unit 162.

The various operational positions of the units associated with the shuttle unit 162 are indicated to the computer 51 by means of signals obtained from various limit switches. To this end, when the piston rod 189 associated with the cylinder 188 is in its mid-position, depicted in FIGS. 9 and 11, wherein the bracket is engaged between the two stop rods 233 and 234 associated with the stop mechanisms 231 and 232, respectively, a limit switch 246 is actuated by means of an angular bar member 247, depicted in FIG. 12, which is attached to the slide 192 and extends outwardly to the side of the bed 186 in position to actuate one of the three limit switches 246, 248 or 249, depending upon the position to which the slide has been moved through the actuation of the rod 189. Thus, when the stop mechanism 231 is actuated to retract the stop 233 and fluid pressure is admitted to the head end of the cylinder 188 to effect the leftward movement of the rod 189, the full leftward travel of the rod will be indicated by a signal obtained from the limit switch 248, which will be actuated by the bar 247 moving with the slide 192. On the other hand, should the stop mechanism 232 be actuated to withdraw its stop 234 and the fluid pressure admitted to the rod side of the cylinder 188 to effect the rightward movement of the rod 189 from the position it occupies in FIGS. 9 and 11, to a rightwardly position where it is fully retracted within the cylinder, the full retracted or rightward position of the bracket 191 will be indicated by a signal obtained from the limit switch 249.

A similar arrangement is provided for indicating to the computer the position of grip slide 199. To this end, when the cylinder 196 is energized by admitting fluid pressure to the head side of the cylinder so as to effect a rightward outward movement of the rod 197 to its fully extended position, the full extention of the rod and thereby the rightward position of the slide 199 will be indicated from a signal obtained from a limit switch 251 actuated by means of a dog 252. The dog 252 is mounted on the underside of the bar member 202 of carrier grip slide 199, as depicted in FIG. 12, in position to actuate the limit switch 251 in a clockwise direction, as viewed in FIG. 11, when the rod 197 has been fully extended to the right. On the other hand, when the rod 197 has been retracted within the cylinder its full limit of travel, a dog 253 also carried on the underside of the bar member 202 of the grip slide 199, will be positioned to actuate the limit switch 251 in a counterclockwise direction, as viewed in FIG. 11.

The position of the bifurcated grip 221 is indicated to the computer by means of a pair of limit switches 256 and 257, depicted in FIGS. 13 and 14, which are respectively mounted on a pair of brackets 261 and 262 respectively, carried by the slide 199 at the rear of the actuator 224. With the bifurcated grip 221 in a retracted position a cam lobe 258A of a cam 258 which is mounted on the extending end of the motor shaft to rotate with the shaft, is positioned to actuate the switch 256. However, when the actuator 224 is energized for pivoting the finger grip 221 from its retracted position to a vertical position wherein it is positioned to grip a pallet, the cam 258 rotating with the shaft will be moved so as to move the cam lobe 258A out of engagement with the switch 256 and move a cam lobe 258B into position to actuate the limit switch 257. With the switch 257 actuated, a signal is provided to the satellite computer 51 to indicate to it that the grip 221 is in engagement with a pallet.

A similar arrangement is provided for the grip 222 on the right end of the slide 199. To this end, a pair of limit switches 266 and 267 are carried on a pair of brackets 268 and 269 respectively located on the right end of the slide 199, as depicted in FIGS. 11 and 14, in position wherein the switches 266 and 267 are located adjacent to a cam 271. With the grip 222 in a retracted position, the cam 271 will be positioned so that a cam lobe 271A is in position to actuate the switch 266 thereby providing a signal to the satellite computer 51 to indicate to it that the grip is in a retracted position. However, when the actuator 227 has been energized to effect pivotal movement of the grip 222 from the retracted position to an upright deposit engaging position, the cam 271 will be rotated so as to position a cam lobe 271B in position to actuate the limit switch 267. The switch 267 upon being actuated provides a signal to the satellite computer to indicate to the computer that the grip 222 is in an extended pallet engaging position.

The pallet transfer mechanism 162 set forth is a unique arrangement whereby a pallet from the storage receiving table 167 may be shuttled from the storage position onto the shuttle unit 162 while a maching operation is being performed on a workpiece at the station and there is no danger of the shuttle mechanism interferring with the operation of the working machine. It is also apparent that the operation of the shuttle arrangement will not infringe upon the path of travel of a pallet transfer vehicle except when it is directly engaged to transfer a pallet from a vehicle located at the station whereby the pallet is transferred from the transport vehicle onto the receiving table. Thus, vehicle movement may be accomplished without any interference from the shuttle mechanism and a work operation may be performed on the workpiece while the shuttle mechanism is operating to transfer a workpiece from the storage position on the table 167 into the unit 162 to await its transfer into the machine station.

The principles of this invention having now been fully explained in connection with the foregoing description, we hereby claim as our invention:

1. A manufacturing system having a plurality of different work stations each operable to perform different work operations on different workpieces;
   an endless pathway along which workpieces are moved to a selected one of said work stations;
   at least one loading station along the pathway at which station workpieces are introduced into the pathway for movement to a selected one of said work stations;
   transport means guided along said pathway and operable to receive the workpiece at the loading station and move with it to a selected work station;
   power means on said transport means operably connected to effect the power movement of said transport along said pathway in either direction;
   control means operably connected to regulate the operation of said power means;
   a computer system operable to transmit command signals to said control means to operate said control means for regulating said power means for producing the desired operation of said transport means;
   means at each work station operable to engage a workpiece on said transport means at said work station and to transfer the workpiece from the transport means into a work position at the work station; and
   a carrier movably supported in operative proximity to said pathway and said transfer means, said carrier being provided with a plurality of workpiece receiving positions, said carrier being also indexable to position any one of said receiving positions in a location to receive a workpiece from a transport and said workpiece in the position may be transferred to the work station.

2. A manufacturing system having a plurality of different work stations each operable to perform different work operations on different workpieces;
   an endless pathway along which workpieces are moved to a selected one of said work stations;
   at least one loading station along the pathway at which station workpieces are introduced into the pathway for movement to a selected one of said work stations;
   transport means guided along said pathway and operable to receive the workpiece at the loading station and move with it to a selected work station;
   power means on said transport means operably connected to effect the power movement of said transport along said pathway in either direction;
   control means operably connected to regulate the operation of said power means;
   a computer system operable to transmit command signals to said control means to operate said control means for regulating said power means for producing the desired operation of said transport means;
   means at each work station operable to engage a workpiece on said transport means at said work station and to transfer the workpiece from the transport means into a work position at the work station;
   a workpiece receiving table having a plurality of workpiece receiving zones;
   power means operable in response to a command signal from said computer system to move said table to locate a particular receiving zone in position to receive a workpiece from said transport means; and,
   shuttle means operable to transfer a workpiece from said transport means to said receiving zone on said table.

3. A manufacturing system according to claim 2 wherein said shuttle means is operable to transfer a workpiece from a zone on said table.

4. A manufacturing system according to claim 2 wherein said shuttle means includes a base interposed between said storage device and the operating position of said work station;
   a grip carrier movably supported on said base for reciprocal movement thereon;
   a pair of grips mounted on said carrier for movement with it and for independent movement relative to said carrier between an operative and an inoperative position;

separate actuators for each of said grips mounted on said carrier for movement therewith, said actuators being operable to move their associated grips between an operative and an inoperative position selectively;

a first power means supported by said base for movement relative to the base and in the direction in which said carrier is movable, said first power means being connected to said carrier and operable to effect the movement of said carrier in either direction selectively; and, a second power means fixedly supported on said base and operatively connected to effect the bodily movement of said first power means in either direction selectively, whereby said carrier will be moved a first distance by operation of said first power means and will be moved an additional distance by operation of said second power means.

5. A manufacturing system according to claim 4 wherein said first power means is mounted on a slide for movement with said slide, said slide being supported by said base for reciprocal movement; and, said second power means is connected to move said slide in either direction selectively.

6. In a manufacturing system having a plurality of work stations adapted to receive workpieces for the performance of a work operation;

a self-propelled vehicle workpiece transport guided throughout the system for positioning a workpiece at a desired one of the work stations;

a work piece storage device having a plurality of workpiece receiving positions;

power means operably connected to effect positioning movement of said storage device to locate any one of the plurality of workpiece receiving positions in position at the work station to receive a workpiece from a workpiece transport vehicle located at the work station;

shuttle means operable to engage with and transfer a workpiece from a workpiece transport vehicle located at the work station into a workpiece receiving position on said storage device, said shuttle means also being operable to engage and transfer a workpiece from a workpiece receiving position of said storage device into a work position of said work station.

7. A manufacturing system having a plurality of different work stations each operable to perform different work operations on different workpieces;

a transport vehicle adapted to receive different workpieces and transport the workpieces about the manufacturing system;

power means on said transport vehicle operably connected to propel the transport vehicle;

guide means for guiding said transport vehicle in a movement to said work stations selectively;

workpiece transfer means at each work station operable to engage a workpiece on a transport vehicle located at the station and to remove the workpiece from the transport vehicle and transfer it into a work position at the work station;

a workpiece storage unit for receiving workpieces from said transport vehicle and storing them preparatory to a work operation; and, said workpiece transfer means is operable to transfer workpieces from said transport vehicle to said workpiece storage unit and from said workpiece storage unit to said work station.

8. A manufacturing system according to claim 7 including:

an unloading station associated with each work station for receiving the completed workpieces; and, a workpiece unloading transfer mechanism at each unloading station for transferring the completed workpieces from the work station onto a transport vehicle for movement to another portion of the system.

9. A manufacturing system having a plurality of different work stations each operable to perform different work operations on different workpieces;

a plurality of transport vehicles adapted to receive different workpieces and transport the workpieces about the manufacturing system;

power means on said transport vehicle operably connected to propel the transport vehicle;

guide means for guiding said transport vehicle in a movement to said work stations selectively;

workpiece transfer means at each work station operable to engage a workpiece on a transport vehicle located at the station and to remove the workpiece from the transport vehicle and transfer it into a work position at the work station;

control means connected to regulate the operation of said power means for controlling the operation of said transport vehicle along said guide means;

identification means on each of said transport vehicles to individually identify the transport vehicles for distinguishing them from each other; and, a reader at each of said work stations for reading the identification means on each transport vehicle as it approaches a work station, said reader being connected to transmit the identification of the transport vehicle to said control means so that the location of said transport vehicle is registered in said control means.

10. A manufacturing system having a plurality of different work stations each operable to perform different work operations on different workpieces;

a transport vehicle adapted to receive different workpieces and transport the workpieces about the manufacturing system;

power means on said transport vehicle operably connected to propel the transport vehicle;

guide means for guiding said transport vehicle in a movement to said work stations selectively;

workpiece transfer means at each work station operable to engage a workpiece on a transport vehicle located at the station and to remove the workpiece from the transport vehicle and transfer it into a work position at the work station;

a plurality of pallets for receiving the workpieces to facilitate their movement through the system;

locating means on said transport vehicle for engagement with said pallet for accurately positioning said pallet and its associated workpiece; and, positioning means associated with each work station and engageable with said transport vehicle for positioning the transport vehicle as well as the pellet and workpiece carried thereon so that the pallet may be engaged by said workpiece transfer means for transfer off of the transport vehicle or for transferring a completed workpiece back onto said trasnport vehicle.

11. A manufacturing system according to claim 10 including:
an elevating mechanism associated with each work station for operation after said transport vehicle is located by said positioning means to raise the pallet and its associated workpiece off of the vehicle to disengage said locating means and position the pallet for engagement with said workpiece transfer means.

12. A manufacturing system having a plurality of different work stations each operable to perform different work operations on different workpieces;
an endless pathway along which workpieces are moved to a selected one of said work stations;
at least one loading station along the pathway at which station workpieces are introduced into the pathway for movement to a selected one of said work stations;
transport means guided along said pathway and operable to receive the workpiece at the loading station and move with it to a selected work station;
power means operably connected to effect the power movement of said transport along said pathway in either direction;
control means operably connected to regulate the operation of said power means;
a computer system operable to transmit command signals to said control means to operate said control means for regulating said power means for producing the desired operation of said transport means;
means at each work station operable to engage a workpiece on said transport means at said work station and to transfer the workpiece from the transport means into a work position at the work station; and,
a carrier movably supported in operative proximity to said pathway and said transfer means, said carrier being provided with a plurality of workpiece receiving positions, said carrier being also indexable to position any one of said receiving positions in a location to receive a workpiece from a transport and said workpiece in the position may be transferred to the work station.

13. A manufacturing system having a plurality of different work stations each operable to perform different work operations on different workpieces;
an endless pathway along which workpieces are moved to a selected one of said work stations;
at least one loading station along the pathway at which station workpieces are introduced into the pathway for movement to a selected one of said work stations;
transport means guided along said pathway and operable to receive the workpiece at the loading station and move with it to a selected work station;
power means operably connected to effect the power movement of said transport means along said pathway in either direction;
control means operably connected to regulate the operation of said power means;
a computer system operable to transmit command signals to said control means to operate said control means for regulating said power means for producing the desired movement of said transport means; and,
means at each work station operable to engage a workpiece on said transport means at said work station and to transfer the workpiece from the transport means into a work position at the work station.

14. In a manufacturing system having a plurality of work stations adapted to receive workpieces for the performance of a work operation;
a workpiece transport guided for movement throughout the system along a predetermined path for positioning a workpiece at a desired one of the work stations;
a workpiece storage device having a plurality of workpiece receiving positions;
power means operably connected to effect positioning movement of said storage device to locate any one of the plurality of workpiece receiving positions in position at the work station to receive a workpiece from a workpiece transport located at the work station; and,
shuttle means operable to engage with and transfer a workpiece from a workpiece transport located at the work station into a workpiece receiving position on said storage device, said shuttle means also being operable to engage and transfer a workpiece from a workpiece receiving position of said storage device into a work position of said work station.

15. A manufacturing system having a plurality of different work stations each operable to perform different work operations on different workpieces;
a transport carrier adapted to receive different workpieces and transport the workpieces about the manufacturing system;
power means operably connected to propel said transport carrier;
guide means for guiding said transport carrier in a movement to said work stations selectively;
workpiece transfer means at each work station operable to engage a workpiece on a transport carrier located at the station and to remove the workpiece from the transport carrier and transfer it into a work position at the work station;
a workpiece storage unit for receiving workpieces from said transport carrier and storing them preparatory to a work operation; and,
said workpiece transfer means is operable to transfer workpieces from said transport carrier to said workpiece storage unit and from said workpiece storage unit to said work station.

16. A manufacturing system according to claim 15 including:
an unloading station associated with each work station for receiving the completed workpieces; and, a workpiece unloading transfer mechanism at each unloading station for transferring the completed workpieces from the work station onto a transport carrier for movement to another portion of the system.

17. A manufacturing system having a plurality of different work stations each operable to perform different work operations on different workpieces;
a plurality of transport vehicles adapted to receive different workpieces and transport the workpieces about the manufacturing system;

power means operably connected to propel the transport vehicle;
guide means for guiding said transport vehicle in a movement to said work stations selectively;
workpiece transfer means at each work station operable to engage a workpiece on a transport vehicle located at the station and to remove the workpiece from the transport vehicle and transfer it into a work position at the work station;
control means connected to regulate the operation of said power means for controlling the operation of said transport vehicle along said guide means;
identification means on each of said transport vehicles to individually identify the transport vehicles for distinguishing them from each other; and,
a reader at each of said work stations for reading the identification means on each transport vehicle as it approaches a work station, said reader being connected to transmit the identification of the transport vehicle to said control means so that the location of said transport vehicle is registered in said control means.

18. A manufacturing system having a plurality of different work stations each operable to perform different work operations on different workpieces;
a transport vehicle adapted to receive different workpieces and transport the workpieces about the manufacturing system;
power means operably connected to propel the transport vehicle;
guide means for guiding said transport vehicle in a movement to said work stations selectively;
workpiece transfer means at each work station operable to engage a workpiece on a transport vehicle located at the station and to remove the workpiece from the transport vehicle and transfer it into a work position at the work station;
a plurality of pallets for receiving the workpieces to facilitate their movement through the system;
locating means on said transport vehicle for engagement with said pallet for accurately positioning said pallet and its associated workpiece; and,
positioning means associated with each work station and engageable with said transport vehicle for positioning the transport vehicle as well as the pallet and workpiece carried thereon so that the pallet may be engaged by said workpiece transfer means for transfer off of the transport vehicle or for transferring a completed workpiece back onto said transport vehicle.

* * * * *